United States Patent Office 3,170,949
Patented Feb. 23, 1965

3,170,949
BIS(FLUOROALKYL)MALONONITRILES
AND THEIR PREPARATION
Stephen Proskow, Claymont, Del., assignor to E. I. du Pont de Nemours and Company, Wilmington, Del., a corporation of Delaware
No Drawing. Filed Nov. 20, 1962, Ser. No. 239,081
4 Claims. (Cl. 260—465.7)

This invention relates to, and has as its main objects provision of, novel and useful dinitriles having fluoroalkyl substituents and a method for the preparation of the same.

A number of halogenated dinitriles are known, for example, difluoromalononitrile (French Patent 1,212,245), hexafluoroglutaronitrile [Chemical Abstracts 44, 9475f (1950)] and halogenated dinitriles of the formula $$HCX_2CX(CN)_2$$

wherein X represents a halogen (U.S. Patent 2,774,783). In accordance with the present invention, a new class of fluoroalkylmalononitriles has been prepared comprising bis(fluoroalkyl)malononitriles of the formula

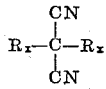

wherein each $R_x$ is selected from the group consisting of perfluoroalkyl, chloroperfluoroalkyl and ω-hydroperfluoroalkyl having up to 10 carbon atoms.

These bis(fluoroalkyl)malononitriles possess many properties both unusual and unexpected in comparison with the properties of the hitherto-known fluoroalkylnitriles. More particularly, the bis(fluoroalkyl)malononitriles of this invention undergo unexpected types of reactions with many common reagents. For example, difluoromalononitrile reacts with water at 25° C. to form difluoromalonamide,

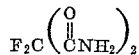

On the other hand, bis(trifluoromethyl)malononitrile undergoes no reaction with water at temperatures up to 100° C. for a period of 48 hours. In order to prepare bis(trifluoromethyl)malonamide, it is necessary to treat bis(trifluoromethyl)malononitrile with concentrated sulfuric acid or sulfuric acid containing 20% $SO_3$ at 25° C.

As another example, ammonia causes degradation of bis(trifluoromethyl)malononitrile to ammonium fluoride. In contrast, ammonia reacts with difluoromalononitrile to form an amidine which on heating forms the highly cross-linked s-triazine polymer

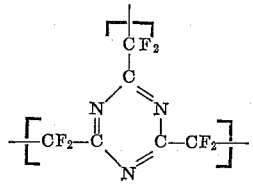

Ammonia also reacts with perfluoroalkylnitriles to form amidines.

The bis(fluoroalkyl)malononitriles of this invention also differ unexpectedly in their reactions with bases and thiols, in comparison with hitherto known perfluoroalkylnitriles. Thus, aqueous sodium hydroxide causes degradation of bis(trifluoromethyl)malononitrile to sodium fluoride whereas aqueous sodium hydroxide with perfluoroalkylnitriles yields the corresponding carboxylic acids. The difference in the behavior of the bis(fluoroalkyl)-malononitriles of this invention and perfluoroalkylnitriles with thiols is shown by the following equations:

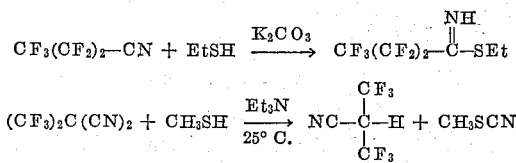

The bis(fluoroalkyl)malononitriles of this invention are prepared by pyrolyzing at 500–900° C. a fluoroacyl cyanide dimer of the formula

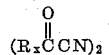

wherein $R_x$ has the meaning defined above. Best results are obtained when the pyrolysis is carried out at temperatures between 600 and 700° C.; consequently this is the preferred pyrolysis temperature range.

The pyrolysis is conveniently carried out at atmospheric pressure. However, subatmospheric or superatmospheric pressures can be employed if desired. It is also convenient to employ a stream of an inert carrier gas, e.g., nitrogen, to carry the fluoroacyl cyanide dimer through the heated reaction zone and to carry the pyrolysis products into the receiver. This use of an inert carrier gas is not essential since carbon dioxide is formed as one of the pyrolysis products and this gas also facilitates transfer of the reactant and reaction products through the reaction zone.

The pyrolysis products leaving the reaction zone are collected in a receiver cooled to a low temperature, e.g., about −80° C., by means of a mixture of solid carbon dioxide and acetone. The resulting bis(fluoroalkyl)malononitrile can be isolated and purified by fractional distillation in a conventional way.

The fluoroacyl cyanide dimers used as starting materials in the process of this invention can be prepared from the corresponding fluoroacyl chlorides and silver cyanide by the method described by R. H. Patton and J. H. Simons in J. Am. Chem. Soc. 77, 2016 (1955).

The products and process of this invention are illustrated in further detail in the nonlimiting examples which follow.

EXAMPLE I.—BIS(TRIFLUOROMETHYL)-
MALONONITRILE

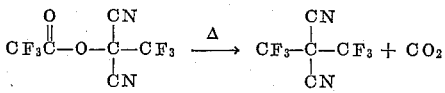

A platinum tube inclined at an angle of about 25° with the horizontal is heated at 760° C. over a length of 12″, and 10 ml. of trifluoroacetyl cyanide dimer is added dropwise over a period of one hour. A stream of nitrogen at a flow rate of about 100 cc. per minute is passed through the tube during the addition. The reaction products are collected in a trap cooled by a mixture of solid carbon dioxide and acetone. The volatile material collected in the trap is transferred to a clean trap by simple distillation in vacuo. The liquid is then fractionally distilled and there is obtained about 4 ml. of a colorless liquid product boiling at 28–29° C. This product is identified as bis(trifluoromethyl)malononitrile by infrared, nuclear magnetic resonance, and elemental analyses.

*Analysis.*—Calc'd for $C_6F_6N_2$: C, 29.93%; F, 56.40%; N, 13.87%. Found: C, 30.23%; F, 56.34%; N, 13.28%.

When the procedure of Example I is repeated with chlorodifluoroacetyl cyanide dimer and perfluoropropionyl cyanide dimer substituted for trifluoroacetyl cyanide dimer, bis(chlorodifluoromethyl)malononitrile and bis(perfluoroethyl)malononitrile, respectively, are formed.

The products and process of this invention have been illustrated above by reference to the preparation of specific bis(fluoroalkyl)malononitriles. However, the products of this invention include any bis(fluoroalkyl)malononitrile having the general formula

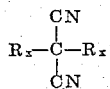

where $R_x$ is as defined above. Other specific bis(fluoroalkyl)malononitriles are listed in the following Table I, together with the specific fluoroacyl cyanide dimers from which they are prepared.

*Table I*

| Fluoroacyl Cyanide Dimer Reactant | Bis(fluoroalkyl)malononitrile |
|---|---|
| $(HCF_2COCN)_2$ | $(HCF_2)_2C(CN)_2$ |
| $(CH_2FCOCN)_2$ | $(CH_2F)_2C(CN)_2$ |
| $(CF_3CF_2CF_2COCN)_2$ | $(CF_3CF_2CF_2)_2C(CN)_2$ |
| $[CF_3(CF_2)_4COCN]_2$ | $[CF_3(CF_2)_4]_2C(CN)_2$ |

The products of this invention are useful for various purposes. They are especially useful as cyanating agents for mercaptans, whereby useful known thiocyanates can be prepared by a simplified procedure. For example, methyl thiocyanate can be prepared as follows: A solution of 7.8 g. of bis(trifluoromethyl)malononitrile and 10 ml. of methanethiol in 15 ml. of anhydrous diethyl ether is stirred one hour at 0° C. Three drops of triethylamine is added and the reaction mixture stirred for 7 hours at room temperature in a reaction vessel fitted with a reflux condenser. The reaction mixture is then distilled, and, after removing a low boiling fraction there is obtained about 3 g. of methyl thiocyanate, having a refractive index $n_D^{25}$, of 1.4618. This product is identified by proton magnetic resonance showing a single sharp resonance for $CH_3S$—, and by an infrared absorption spectrum which is identical with the spectrum of an authentic specimen of methyl thiocyanate. The resulting thiocyanates are useful for the same purpose as the commercially available alkyl thiocyanates, and this process avoids the usual multiple step methods for preparing such thiocyanates.

Since obvious modifications and equivalents in the invention will be evident to those skilled in the chemical arts, I propose to be bound solely by the appended claims.

The embodiments of the invention in which an exclusive property or privilege is claimed are defined as follows:

1. A bis(fluoroalkyl)malononitrile of the formula

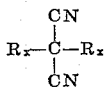

wherein each $R_x$ is selected from the group consisting of perfluoroalkyl, chloroperfluoroalkyl and ω-hydroperfluoroalkyl of up to 10 carbons.

2. Bis(trifluoromethyl)malononitrile.

3. The process of preparing a bis(fluoroalkyl)malononitrile of claim 1 which comprises pyrolyzing, at a temperature of about 500–900° C., a fluoroacyl cyanide dimer of the formula

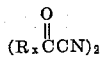

wherein $R_x$ is selected from the group consisting of perfluoroalkyl, chloroperfluoroalkyl and ω-hydroperfluoroalkyl of up to 10 carbons.

4. The process of preparing bis(trifluoromethyl)malononitrile which comprises pyrolyzing trifluoroacetyl cyanide dimer at a temperature of about 500–900° C.

References Cited in the file of this patent

UNITED STATES PATENTS 2,774,783    Ardis _____ Dec. 18, 1956